United States Patent [19]

Mitchell et al.

[11] 4,109,938

[45] Aug. 29, 1978

[54] SYSTEM FOR ARRANGING AND RETRIEVING INFORMATION

[75] Inventors: James A. H. Mitchell, London; Edward J. Day, Kingston Surry, both of England

[73] Assignee: Mitchell Beazley Encyclopedias, Ltd., London, England

[21] Appl. No.: 616,865

[22] Filed: Sep. 25, 1975

[51] Int. Cl.² .............................................. B42F 21/00
[52] U.S. Cl. ..................................... 283/43; 35/35 R
[58] Field of Search ................................. 283/36–43; 40/104.18, 15, 340, 360; 35/35 R

[56] References Cited

U.S. PATENT DOCUMENTS 3,110,508  11/1963  Sendor .............................. 283/42 X

FOREIGN PATENT DOCUMENTS 108,083  12/1924  Switzerland .............................. 283/36
1,039,988  8/1966  United Kingdom ....................... 283/36

OTHER PUBLICATIONS

Classification definitions class 401, pp. 27, 28, published Oct. 1967.

*Primary Examiner*—Stephen C. Pellegrino
*Attorney, Agent, or Firm*—Stephen E. Feldman; Marvin Feldman

[57] ABSTRACT

A heavily illustrated, integrated and correlated system topically arranging information for ready location and comprehension through short descriptions, picture stories, expanded illustrated narratives, or combinations thereof, which are complete in and of themselves, and are cross-referenced and indexed by both illustrations and words or combinations of same. An illustrated comprehensive text, an illustrated alphabetical text, and an illustrated index cooperate to arrange the information within the system.

The illustrated comprehensive text includes numerous articles on selected subjects. Each article includes a main written text, and is heavily pictorialized with a key illustration and ancillary illustrations arranged in a predetermined sequence. Ancillary text, directed only to the illustrations, is disposed proximate to its respective illustration and is correspondingly sequenced. Cross referencing is accomplished by a listing disposed conspicuously in a marginal position.

Key illustrations from the illustrated comprehensive text are, in turn, utilized in the illustrated alphabetical text where such key illustrations, mostly reduced in size, are alphabetically arranged. Each illustrated alphabetical text topic is given and expanded but relatively short description; and is, when pertinent, cross referenced to related illustrated alphabetical text topics, illustrated comprehensive text articles, and a map index when same appear in the system. Each illustrated alphabetical text topic, for which there is a key illustration, is correlated thereto and the key illustration is also cross-referenced to its respective illustrated comprehensive text article.

The pages of the illustrated comprehensive text, are disposed proximate a columnar listing of related illustrated comprehensive text articles, and illustrated alphabetical text topics.

10 Claims, 3 Drawing Figures

FIG. 2

SYSTEM FOR ARRANGING AND RETRIEVING INFORMATION

BACKGROUND OF THE INVENTION — FIELD OF APPLICATION

This invention relates to information retrieval, and more particularly to a system for arranging indexing and cross-referencing information pictorially and by words for ready location and comprehension.

BACKGROUND OF THE INVENTION — DESCRIPTION OF PRIOR ART

Generally, when researching a particular subject, or a group of related subjects, one must determine where to begin. Today, many facilities are available to start such a quest and the one or ones resorted to is usually determined by the particular preferences of the researcher. For some the general catalogue of the library and the resulting textual information is ideal. For others the indexes to magazine, newspaper and periodical articles is where one begins. Still others begin at the reference section looking up the subject or subjects under study in the various reference works and encyclopedias. Depending upon the extent of the research and the degree of content for the product the researcher may have to eventually go to all these sources, but the starting place is important because it may determine the course of the research.

Many times the starting place for the research is, or should be the final place. One does not always require a greatly detailed dissertation, or in depth treatment of the subject in question. Quite often the researcher is looking for only a good definition or short description of a particular item, and would be satisfied with a single paragraph or a good illustration if it covered the subject. At other times, a little more detail is necessary, but the party seeking the information has no desire to wade through an entire text book, or a number of magazine particles. Whether it be for a simple school assignment, or merely to satisfy one's curiosity, more often than not there is only a short amount of time to devote to finding the answer and a quick, simple to find, easy to understand reference is all one needs.

In this latter situation one will often refer to either a single volume or a multi-volume reference work, like an expanded dictionary or an encyclopedia. These may be a library or right in one's home or place of business.

Now the problem changes from what source to look in to where in the source to look. Under what heading or subject title will the answer best be found.

If we use a dictionary, even an expanded dictionary, we simply look up the key word or words in alphabetical order; that is if we know the key word or words. The definition is short, but here is where the search ends. There is almost invariably no reference to other related words (other than synonyms), or to related subject in more expanded words, should one require a little greater depth.

If we use an encyclopedia we must somehow come up with the same subject heading as the author or be unable to find the material. Indexes at the end of the encyclopedia are helpful but it is a guessing game demanding that the researcher eventually arrive at the same title as the party who prepared the index. We all known that the encyclopedia, especially the more comprehensive ones, somewhere has the answer but we have often been unable to the answer because we cannot come up with the key — the subject heading under which the article appears.

While the researcher may have a picture in his mind of what he is in search of, the indexes and usually the majority of the text material, are usually only in words. That is not to say that attempts have not been made to use illustrations as a clue. But systems such as the thumb indexes shown in U.S. Pat. No. 566,943 granted to J. Speyer on Sept. 1, 1896 for Indicator for Books, Forms or the Like and U.S. Pat. No. 1,569,390 granted to R. E. Parker on Jan. 12, 1926 for Book Index are totally unsuitable for a major size work of a great many pages. In addition these thumb indexes must be on the exact pages containing the subject matter and do not reference one to other material.

Should one be lucky enough to find a close subject heading in the conventionally available indexes, or maybe the exact subject heading then he might also be interested in related subjects. However, the references thereto, if available at all, are in the article itself which must usually be read in its entirety even if not quite pertinent, because such related subject references are often lost in the text material, hidden in the footnotes, or buried at the end of the article.

SUMMARY OF THE INVENTION

It is therefore an object of this invention to provide a novel and improved research aid.

It is another object of this invention to provide a novel and improved storage and retrieval system.

It is a further object of this invention to provide a novel and improved system for arranging, indexing, and cross-referencing information pictorially and by words for ready location and comprehension.

It is yet still a further object of this invention to provide a novel and improved relationship between text and illustration wherein the illustrations alone provide a comprehensive understanding of the subject under study.

It is yet still a further object of this invention to provide a novel and improved relationship between text and reference to related subject matter.

It is yet still a further object of this invention to provide a novel and improved expended short descriptive entry type reference work.

It is yet still a further object of this invention to provide a novel and improved illustrated expanded short descriptive entry type reference work.

It is yet still a further object of this invention to provide a novel and improved relationship between the illustrations and short descriptive entries in an illustrated expanded type reference work.

It is yet still a further object of this invention to provide a novel and improved illustrated index.

It is yet still a further object of this invention to provide a novel and improved index which is illustrated and also includes cross-references to subject matter within and may well include subject matter outside of the work being indexed.

In carrying out the invention, according to the preferred embodiment there is provided an information system utilizing as its principal features, an illustrated alphabetical text, an illustrated comprehensive text, and an illustrated comprehensive index which, while each complete in and of themselves are correlated, integrated, and cross-referenced each to the other.

The illustrations of the alphabetical text are arranged in close proximity to each other and in a selected area of each page for rapid access. They are related to their respective descriptive word entries on the same page and also to the illustrated comprehensive text. The word entries are also related to the illustrated comprehensive text as well as to other word entries and a map index where pertinent.

The illustrated comprehensive text utilizes a set of illustrations with a key illustration and ancillary illustrations sequenced to explain the subject without reference to the word text. The word text includes cross-referencing to related subjects conspicuously disposed in relationship to the main body of the text and the illustrations thereof.

The comprehensive illustrated index embodies reduced reproductions of the illustrated comprehensive text pages arranged adjacent columnar listings or related alphabetical and illustrated text references and may include references to related material from other sources. Other objects, features and advantages of the invention, it its details of construction and arrangement of parts, will be seen from the above, from the following description of the preferred embodiment when considered in conjunction with the drawings and from the appended claims.

BRIEF DESCRIPTION OF THE DRAWINGS

FIG. 2 is a specimen layout of a page from the illustrated alphabetical text showing the relationship between the elements thereof which incorporate the instant invention.

DESCRIPTION OF THE PREFERRED EMBODIMENT

For convenience the invention will be described as applied to a reference work having as its key elements a volume of alphabetically arranged short descriptive entries with illustrations related to some of the entries located on their respective pages but blocked together at the top of the pertinent page; a volume of comprehensive text heavily illustrated in color with two adjacent full pages thereof devoted to each subject title, and with cross-referencing to other related subjects appearing as a listing in the central margin; and an illustrated comprehensive index consisting of reduced reproductions of the pages of the illustrated comprehensive text each disposed proximate columnar listings of related illustrated alphabetical text entries, illustrated comprehensive text subject titles. The index may also include a reference to the most pertinent book, school texts, and magazine and periodical articles. The index may be located any place in either text or by itself. If it is located at the start of a text it may be referred to as a table of contents. It is understood, nevertheless, that without departing from the scope of the invention that subject information system may incorporate other key elements or may merely utilize one or more of the enumerated key elements; that each volume may consist of one or more books or that the various volumes may be combined into a single book depending upon the scope of subject matter to be covered; that the illustrations for the alphabetical text may be located to either side or at the bottom of the page or around the periphery thereof; that the illustrations for the comprehensive text may either be in color or in black and white or in combinations thereof and the cross-referencing may be in any marginal location as long as it is conspicuously disposed; and that the information disposed proximate the reduced size page reproductions in the illustrated comprehensive index may be anything suitable for the subject being reviewed.

Figure 1:
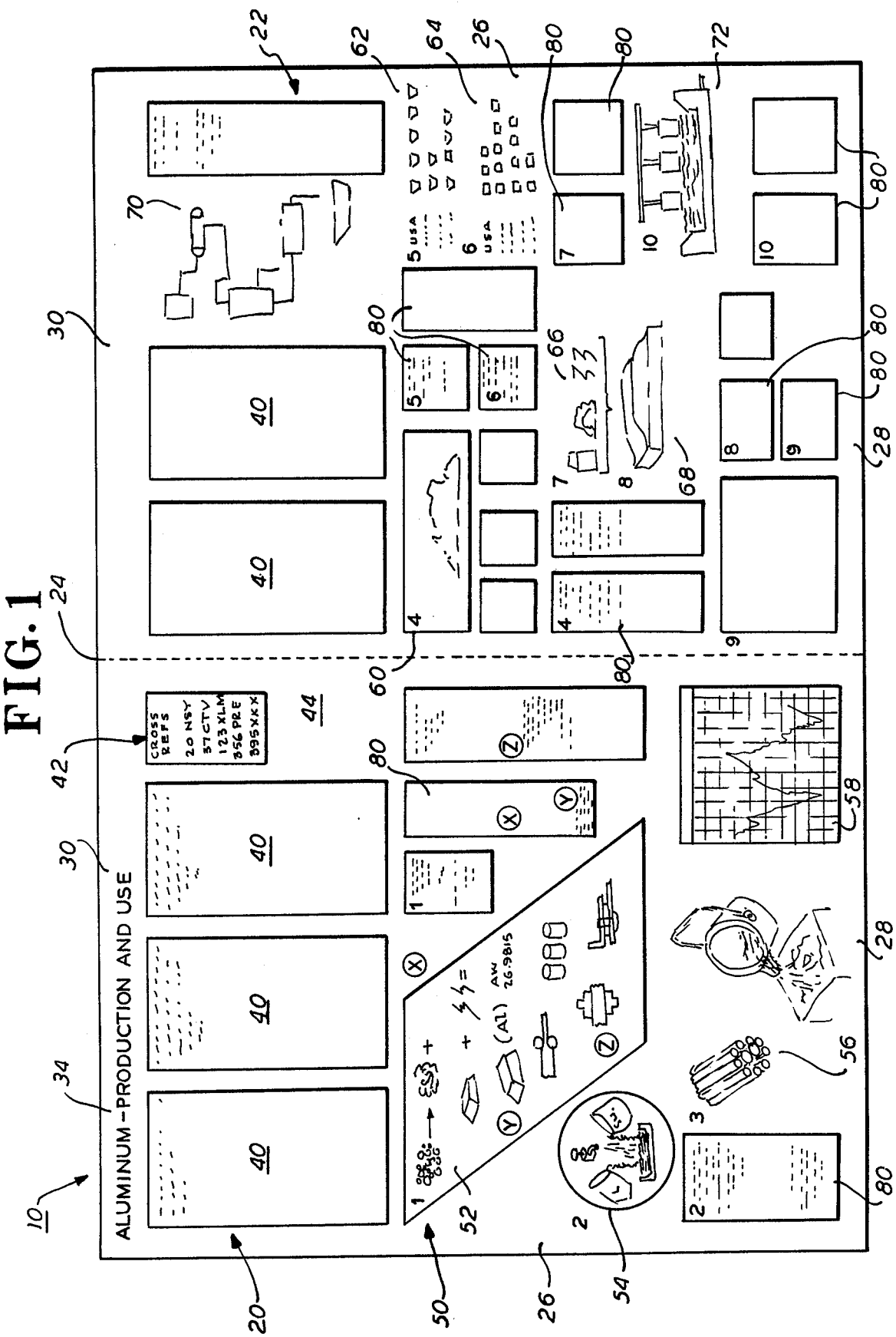
FIG. 1 is a specimen layout of a page from the illustrated comprehensive text showing the relationship between the elements thereof which incorporate the instant invention.

With reference to FIG. 1, there is generally shown at 10 a pair of adjacent pages 20, 21 from the illustrated comprehensive text. Pages 20, 21 are divided along an imaginary line 24 and are printed with margins 26, 28 and 30 as deemed suitable.

A subject heading 34, in this instance "Aluminum-Production and Use" is provided for each such illustated comprehsnsive article. While in this instance only two adjacent pages 20, 22 have been devoted to the subject either less or more space may be allocated depending upon the content of the article.

For each subject heading 34 there is provided a main word text 40 which is set out in a multi-column format and printed in suitable type by conventional techniques. A cross-referencing listing 42 is conspicuously positioned in a central margin area 44 and includes notations to related illustrated comprehensive articles.

Another area 50 is devoted to color illustrations related to the subject heading 34 and includes a key illustration 52 and ancillary illustrations such as 54, 56, 58, 60, 62, 64, 66, 68, 70, and 72. The number of ancillary illustrations depending upon the nature and scope of the subject under subject heading 34. Illustrations 52–72 are consecutively sequenced by being numbered using numbers 1 through 10 depending upon the number of such illustrations. Other sequencing systems such as letters "a" through "z" or roman numerals "I, II, III, " etc. may be used as appropriate. Not all of such illustrations need be numbered.

Illustrations 52–72 are created to be self explanatory, especially when viewed in sequence order, and to stand alone without reference to main text 40. If desired ancillary text 80 may be disposed proximate illustrations 52–72. Ancillary text 80 is also sequenced by arabic numberals, letters, or roman numerals to follow the sequence of illustrations 52–72 and to correspond therewith.

Thus the user, having found the correct subject heading, may either: merely scan illustrations 52–72; scan illustrations 52–72 in conjunction with ancillary text 80; read main text 40; or refer to all or any part of same to learn about the subject in question. Other related illustrated comprehensive text subject headings are located quite easily by the user by reference to cross-reference listing 42, which is quite conspicuous and thus easily located.

Key illustration 52 is generally larger than ancillary illustrations 54–72 and is selected to depict the essence and most important aspects of the subject covered by the subject heading. In the selected example "Aluminum-Production and Use" it could very well be a color diagram showing the transition from ore to smelting to refining, to production into aluminum. Ancillary illustrations 54–72 might, in this example, show the raw material, atomic structure, various end uses, chemical and mechanical properties, a map of sources of supply of the raw material, production charts and bar graphs and the like.

In essence, the user may read as little as time permits or as much as they require and a detailed treatment is available at each level.

Figure 2:
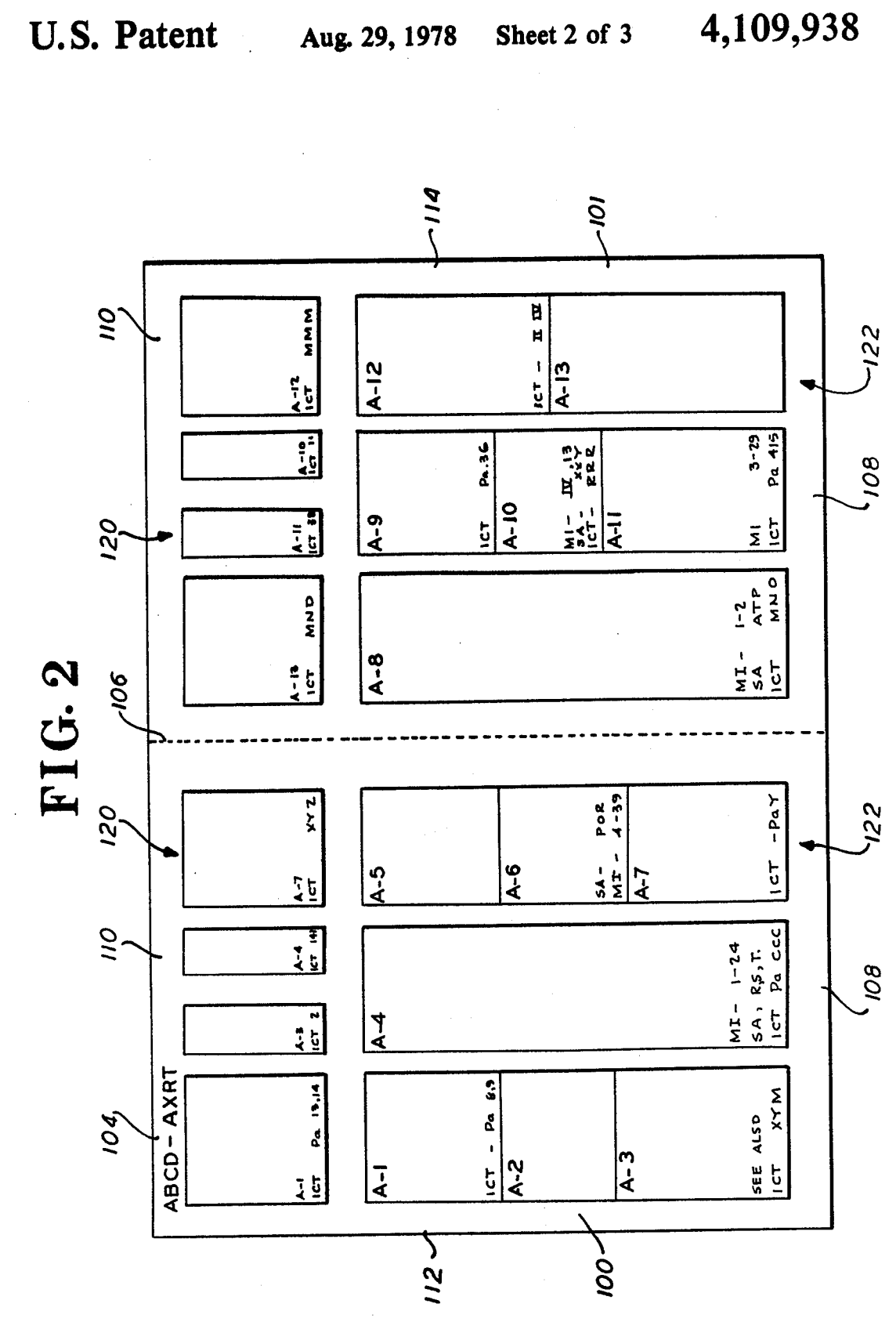

In FIG. 2 there is shown a pair of adjacent pages 100, 101 from an illustrated alphabetical text 104. An imaginary center line 106 divides pages 100 and 101 which are also provided with suitable margins 108, 110, 112 and 114.

Each page or pair of pages 100, 101 includes an illustration area 120 and a word text area 122.

Word text area 122 includes alphabetically arranged descriptive word entries A-1, A-2, A-3 through A-13 as the case may be. The entries are similar to those found in a short encyclopedia (fact entries) but slightly expanded in content. They are reproduced in conventional manner with the word being described in bold face or italics so as to stand out from the text of the description.

Some of the descriptions, such as A-2, A-5 and A-13 are just that, only a description and nothing more. Others, such as A-4, A-6 and A-8 include a cross-reference to a Map (MI) also found in the work. Some of the descriptions, such as A-3, A-4, A-6 and A-10 are followed by "see also" cross-referencing (SA) to other alphabetical text descriptions. Some descriptions such as A-1, A-3, A-4, A-6, A-7, A-8, A-9, A-10, A-11 and A-12 carry references to related subject headings in the illustrated comprehensive text (ICT).

For some descriptions for which there are also illustrated comprehensive text articles there may be reproduced in the illustrations area 120 reduced size copies of the related "key or other illustrations" from the illustrated comprehensive text article; such as key illustration 52 (FIG. 1) or other appropriate illustrations which describe the entry. Each such illustration is marked with the word to be described (A-1, A-3, A-4, A-7, A-8, A-9, A-10 and A-12 respectively). respectively) and also carries a reference to the page of the illustrated comprehensive text subject heading (ICT references).

Thus, the user may either use the illustrated alphabetical text alone or in conjunction with the illustrated comprehensive text. When using the illustrated alphabetical text alone the user may look up a word alphabetically in the word text area 122, and then refer to the pretinent illustration in the illustrations area 120 if present. Alternatively the user, not knowing what the word is may scan the various illustrations and by doing so find the pertinent word.

Once having found the pertinent word, or illustration or both, the user can refer to any other cross-referenced items, if listed, for more details when further information is required.

It should be obvious that correlation between the illustrated alphabetical text and illustrated comprehensive text is thus quite easy and readily accomplished.

Once having found the word and its related key illustration the user can quickly locate the more comprehensive data.

Figure 3:
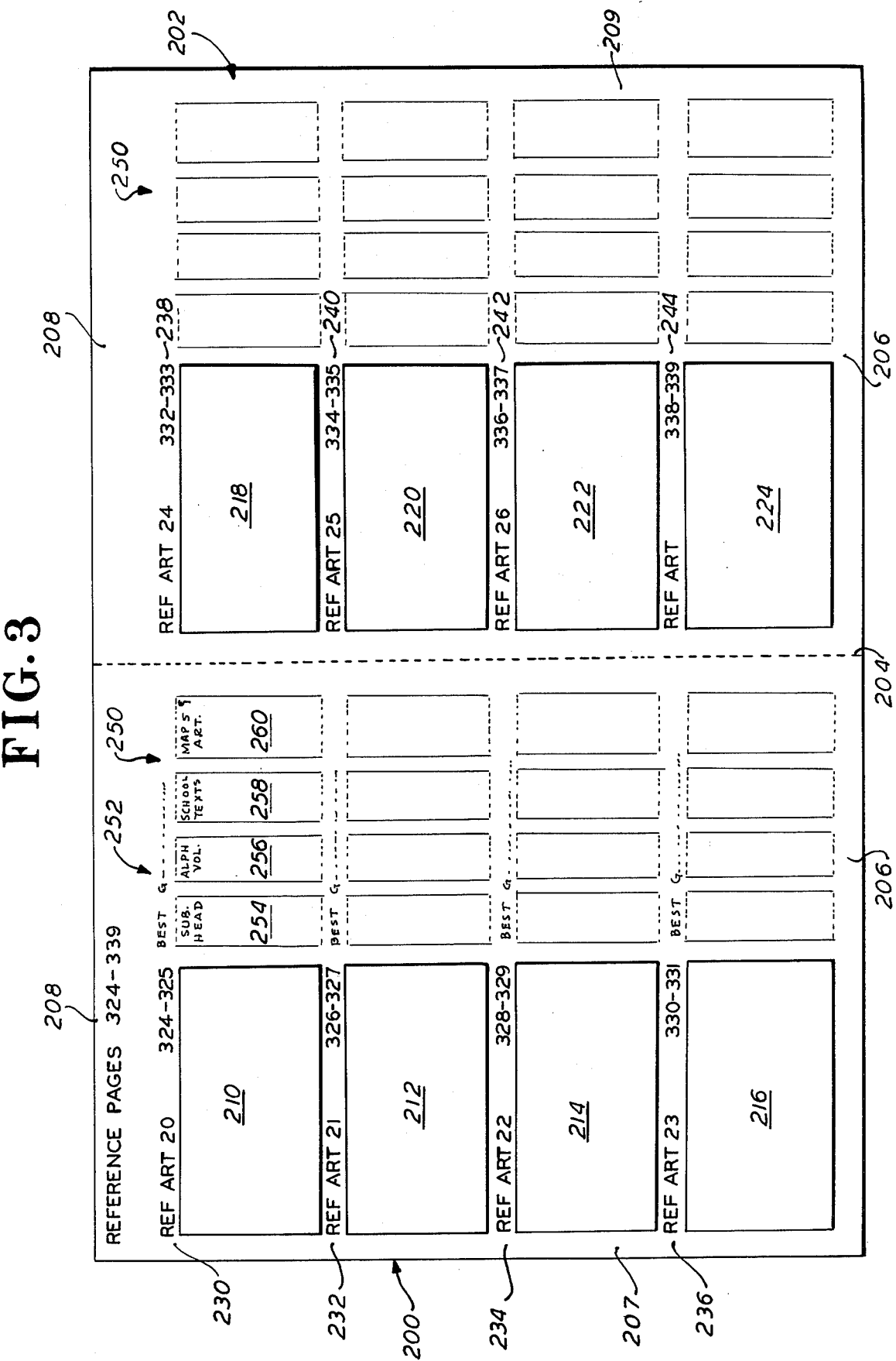
FIG. 3 is a specimen layout of a page from the illustrated comprehensive index showing the relationship between the elements thereof which incorporate the instant invention.

In FIG. 3 there is shown at 200, 202, a pair of pages from the illustrated comprehensive index. Pages 200 and 202 are separated by an imaginary line 204 and provided with appropriate margins 206, 207, 208, and 209. Each page 200, 202 includes a number of page reproductions 210, 212, 214, 216, 218, 220, 222 and 224 each of which being reduced size reproductions of the page or pages constituting the illustrated comprehensive text (such as pages 20, 22 of FIG. 1). The related article heading for page reproductions 210-224 appear at 230-244 respectively followed by the page numbers where the illustrated comprehensive text article is to be found.

Disposed to the side of each page reproductions 210-224 is a reference area 250 where there appears a reference 252 to the best general book related to the subject of the subject heading. Also appearing in reference area 250 are columnar listings for related illustrated comprehensive text subject headings at 254, related alphabetical text topics at 256, which may include related school texts at 258, and related magazine and journal articles at 260.

While column listings 254 and 256 are pertinent to the information system described, the listings in columns 258 and 260 are merely exemplary of the type which might be included. Additional columnar listings may be provided if desired or reference area 250 may merely include only listings 254 and 256.

In using the illustrated comprehensive index the researcher need only scan the pages thereof until either the appropriate subject heading (230-244), appears; or until the user, recognizes as pertinent the illustrations appearing in the page reproductions (210-244). Reference to the appropriate subject heading in the illustrated comprehensive text, to related subject headings, to related alphabetical topics and to other related material is then at the users finger tips by quick reference to the adjacent reference area 250.

From the above description it will thus be seen that a novel and improved correlated, integrated and highly illustrated system has been provided for the storage and retrieval of visual information at various levels of content and in a simple, easily understood, and readily available manner.

In it understood that although I have shown the preferred form of my invention that various modifications may be made in the details thereof without departing from the spirit as comprehended by the following claims.

We claim:

1. An information system comprising:
(a) first information means consisting of a plurality of graphic displays each concerning a particular selected subject:
(b) each of said graphic displays including a main word text and a pictorialized description each sufficient to describe its particular related subject with reference to the other and each disposed in a separate and distinct location within its graphic display;
(c) each pictorialized description including a key illustration and a plurality of ancillary illustrations arranged in a sequence; and
(d) second information means constituting a graphic arrangement of alphabetically set out word descriptions of a plurality of selected topics and a reproduction of a selected illustration from said graphic displays of said first information means, such illustrations pertaining to said topics; wherein each such graphic display includes ancillary word text related to said key illustration and ancillary illustrations, displayed in close proximity to its respective illustration and arranged in numbered sequence corresponding thereto, and wherein each illustration reproduced in said graphic arrangement of said second information means includes a reference to its respective topic as described in said second information means, and a reference to the graphic display in said first information means from which the illustration was taken, and wherein one of said graphic displays includes a reference to a selected topic of said second information means which is pertinent to the information of the adjacent graphic display, and wherein another of said graphic displays includes listings including references to other selected grahic displays of said first information means which are pertinent to the information of the respective adjacent graphic display.

2. The information system of claim 1 wherein said key illustrations, when reproduced for said second information means being grouped together separate from said word descriptions at a selected location in said graphic arrangement and being reduced in size when compared to the size therefor as displayed in said first information means.

3. The information system of claim 1 wherein each graphic display may include a listing of certain selected subjects of said first information means related to its particular subject but set out in said display in a distinctive manner.

4. The information system of claim 3 wherein each such listing is set out in a marginal area of its respective display.

5. The information system of claim 4 wherein each such listing is set out in a centrally disposed marginal area of its respective display.

6. The information system of claim 1 wherein said word descriptions of said selected topics of said second information means include in distinctive manner reference to the selected subjects of pertinent graphic displays and may include references to other selected topics, and to a pertinent portion or portions of a map index also forming part of said information system.

7. The information system of claim 1, further comprising third information means constituting a graphic index including reproductions of said graphic displays of said first information means arranged with each such reproduction disposed adjacent a listing of selected types of information related to its particular subject.

8. The information system of claim 7 wherein said graphic displays of said first information means included in said third information means being reduced in size when compared to said graphic displays as reproduced for said first information means.

9. The information system of claim 7 wherein listings of said third information means includes a reference to a selected textual source of information and a plurality of columnar listings of selected types of information.

10. The informtion system of claim 9 wherein another of said columnar listings includes references to school texts which are pertinent to the information of the adjacent graphic display and wherein another of said columnar listings makes reference to articles appearing in magazines and journals and which are pertinent to the information of the adjacent graphic display.

* * * * *